US010799834B2

(12) United States Patent
McDonald et al.

(10) Patent No.: US 10,799,834 B2
(45) Date of Patent: Oct. 13, 2020

(54) BIPOLAR ELECTROCHEMICAL SPACER

(71) Applicant: Magna Imperio Systems Corp., Houston, TX (US)

(72) Inventors: Brian M. McDonald, Houston, TX (US); Ethan L. Demeter, The Woodlands, TX (US)

(73) Assignee: MAGNA IMPERIO SYSTEMS CORP., Houston, TX (US)

( * ) Notice: Subject to any disclaimer, the term of this patent is extended or adjusted under 35 U.S.C. 154(b) by 210 days.

(21) Appl. No.: 15/853,155

(22) Filed: Dec. 22, 2017

(65) Prior Publication Data

US 2019/0193030 A1 Jun. 27, 2019

(51) Int. Cl.
*B01D 61/46* (2006.01)
*B01D 61/52* (2006.01)
*C02F 1/469* (2006.01)

(52) U.S. Cl.
CPC ............. *B01D 61/52* (2013.01); *B01D 61/46* (2013.01); *C02F 1/4693* (2013.01); *B01D 2313/14* (2013.01)

(58) Field of Classification Search
CPC ... B01D 61/46; B01D 2313/14; C02F 1/4693; C02F 1/4695
See application file for complete search history.

(56) References Cited

U.S. PATENT DOCUMENTS 5,288,385 A * 2/1994 Kedem ................ B01D 61/445 204/631
6,090,258 A 7/2000 Mirsky et al.
6,156,180 A * 12/2000 Tessier ................... B01D 43/00 204/524
2004/0188258 A1 9/2004 Takahashi et al.
2017/0029586 A1 2/2017 Van Engelen et al.
2017/0333846 A1* 11/2017 Inoue ....................... B01J 41/14
2019/0358589 A1* 11/2019 Lu ......................... C02F 1/4693

FOREIGN PATENT DOCUMENTS

EP 0503651 9/1992
WO 02/14224 2/2002
WO 2005/009596 2/2005
WO 2012/081026 6/2012

OTHER PUBLICATIONS

International Search Report and Written Opinion, dated Apr. 12, 2019, directed to PCT/US2018/067327; 12 pages.

* cited by examiner

*Primary Examiner* — Steven A. Friday
(74) *Attorney, Agent, or Firm* — Morrison & Foerster LLP

(57) ABSTRACT

The present invention provides a device capable of reducing the resistance and increasing the ion exchange rate in an electrodialysis, electro-deionization, or capacitive deionization apparatus and a method for producing said device. More specifically, the device is an electrodialysis spacer designed to have an ionically conductive surface of either cationic nature, anionic nature or a combination of both, which act as conductive pathways for ions as they move towards their respective electrode. The method of producing said spacer involves coating a substrate, such as a woven mesh, expanded netting, extruded netting or non-woven material, with perm-selective ionomer solutions and applying that substrate to an inert spacer material that has undergone chemical or mechanical etching.

11 Claims, 7 Drawing Sheets

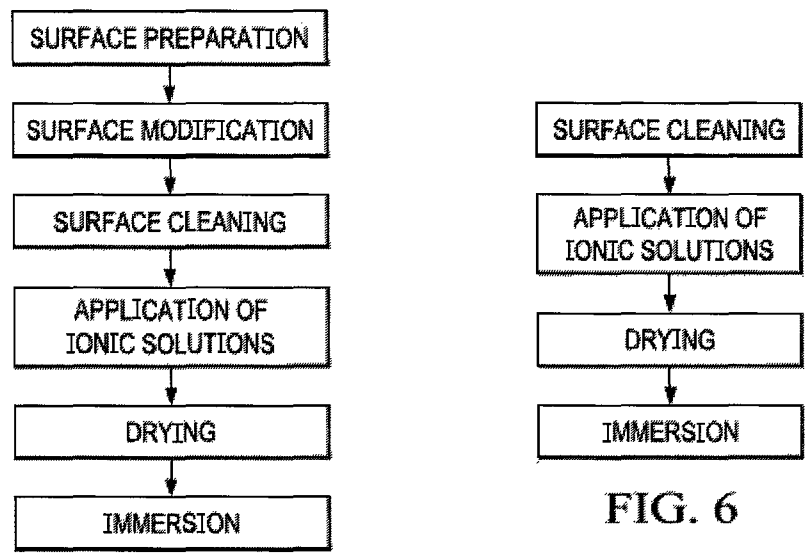
FIG. 5
FIG. 6
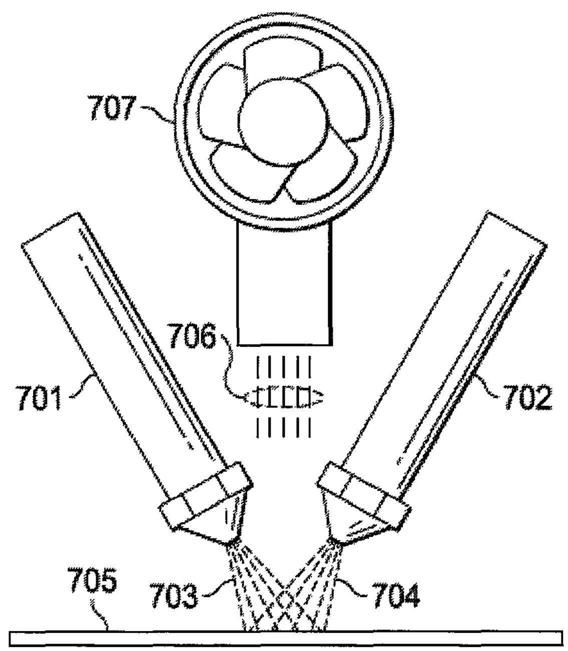
FIG. 7

BIPOLAR ELECTROCHEMICAL SPACER

FIELD OF THE INVENTION

The present invention pertains to a bipolar, ion-conducting spacer and a method for producing an ion-conducting spacer for use in an ion-exchange water treatment system, such as electrodialysis (ED), electrodialysis reversal (EDR), electrodialysis metathesis (EDM), reverse electrodialysis (RED) or electro-deionization (EDI).

BACKGROUND

In the current state of the art, electrodialysis, as a method, is used to selectively remove positive and negative ions from a water source, such as brackish water or the brine solution produced in reverse osmosis units, through transportation of salt ions from one solution to another solution via ion-exchange membranes upon the application of an electrical current. The electrodialysis apparatus itself is comprised of a pair of electrodes, where a voltage is applied to initiate an electrochemical reaction, alternating anionic and cationic exchange membranes, which are used to selectively separate ions from one stream while concentrating said ions in adjacent streams from a dilute solution feed stream (dialysate compartment) to concentrate stream (brine compartment), and spacer materials, which are placed in between the ion exchange membranes. While the anode attracts negatively charged ions (e.g. chloride) and the cathode attracts positively charged ions (e.g. sodium), it is the primary function of the spacer material to create turbulence in the flow field and to restrict the membranes from contacting one another.

Although the spacer does provide a necessary function to the electrodialysis unit, it doesn't come without a cost. The electrical energy required to transport ions from one stream to another is a function of the resistance of the system, via Ohm's law (Eq. 1), where V is the electrical potential, i is the current density, and R is the resistance. While the rate of desalination may be accelerated through an increase in the electric potential (V), current density (i) (i.e. the amount of electric current flowing per unit cross-sectional area of a material), as a function of electric potential (V), this can be increased only to a point of electrochemical polarization impedance. Turning to the second, more highly mutable function, the resistance of the system, this opposing force can be seen to be impacted largely by both K, the conductivity of the water in the unit (which consequently decreases as the ions are removed and the distance between the membranes), and L, determined by the spacer thickness. Thus, resistance scales linearly (i.e. increases) with the intermembrane spacing, as seen by equation 2.

$$V=i*R \quad \text{Equation 1}$$

$$R=K^{-1}*L \quad \text{Equation 2}$$

Previous attempts to improve spacer design constructed to overcome the aforementioned infirmities use primarily inert polymeric materials which are able to create turbulence, resulting in an increased rate of contact of ions with membrane surfaces and subsequent increased ion exchange rates, but do not provide any means of reducing electrical resistance. As evidenced in Herron et. al (U.S. Pat. No. 5,407,553), the inventors disclose "an electrocell having a novel design for promoting high turbulence in that portion of the electrocells sensitive to fouling or limiting current problems" and "membranes (e.g., anode membrane, brine membranes and cathode membranes) [are] intentionally allowed to deflect in response to fluid pressure differentials so that a flow path with a constantly changing direction is formed". Yet the turbulence created by the invention detailed in the '553 patent suffers from serious limitations that (1) requires energy input detracting from the overall efficiency of the process and (2) creates the rate limiting step of physical manipulation of salinated water through a dialysis stack. Additionally, U.S. Pat. No. 6,090,258 issued to Mirsky et al., describes an ion-exchange spacer and processes of making said spacer incorporating both heterogeneous and homogeneous ion-conducting coatings. In particular, the authors describe a process of coating a polymeric netting with a polymeric coating, where the coating contains ion exchange resin particles to impart ion exchange capacity. Although it does reduce the resistance, the described method is limited in that it could only make a unipolar conductive spacer, consisting of either cation-conducting or anion-conducting spacer material, thereby greatly decreasing its utility in water desalination as a unit functioning to remove both positively and negatively charged ions with one bipolar functioning spacer substrate.

Some other previous attempts exist which utilize textured membranes for enhanced ion exchange. Various disclosures impart a three-dimensional shape to the surface of the membranes while also varying the thickness of the membranes (See generally Pat. Application Nos. WO2005009596A1, WO2002014224A1, and US20170029586A1. So, although this does reduce the resistance, it is limited in that it does not create sufficient turbulence in the fluid flow field or provide for a sufficient decrease in the amount of electrical resistance that is the required to advance ion conduction and electrodialysis beyond current practices.

Thus, there is a long-standing need in the art for an apparatus and method of creating a bipolar conductive spacer that maximally reduces the electrical resistance, via both an anionic and cationic coating, and creates turbulence sufficient to enhance and advance electrodialysis, electro-deionization, and capacitive deionization beyond its limited current state. The present invention satisfies this long-standing need in the art and seeks to remedy all the deficiencies detailed above.

SUMMARY

The electrodialysis device described herein illustrates an apparatus and method for use exhibiting a mixture of anion and cation ion-exchange materials adhered to a electrodialysis spacer surface material (that may be woven porous or non-woven) to produce a network of both anionic and cationic exchange channels that results in a bipolar, ionically conductive electrochemical spacer device designed to (1) increasing the surface area of the substrate (applied mesh or net material) and (2) create an anionic and cationic substrate through application of solutions to the surface of the spacer surface material. This increase in surface area directly enhances the creation of turbulent passageways, thereby improving ion-exchange rates via amplified rates of contact with appropriate membranes. Equally, the creation of a dually charged, bipolar ion-conductive spacer surface allows for a greatly accelerated ion exchange rate beyond that of a unipolar ion-conductive surface.

BRIEF DESCRIPTION OF THE DRAWINGS

Refer now to the drawings wherein depicted elements are not necessarily shown to scale, and like, or similar, elements may be designated by the same reference numerals through the several figures. In the drawings:

FIG. 5 is a flow diagram detailing the process of applying ionomer to the surface of a spacer material that firsts modifies the surface of the spacer.

FIG. 6 is a flow diagram detailing the process of applying ionomer to the surface of a spacer material without surface preparation or surface modification.

FIG. 7 is a simplified schematic of the process of applying ionomer to the surface of a spacer's exterior to increase the conductivity of the spacer material.

TERMINOLOGY

Figure 1:
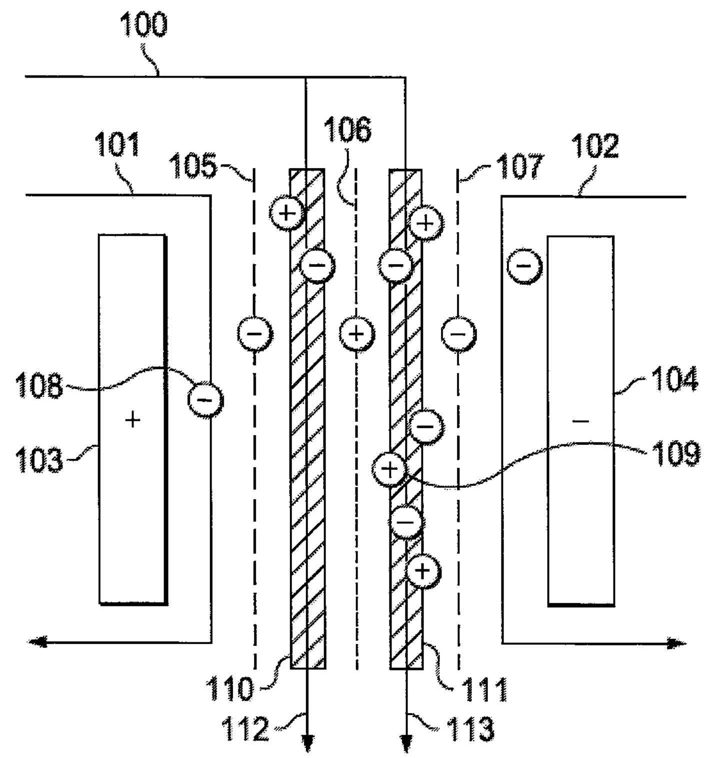
FIG. 1 is a detailed schematic representation of an operating electrodialysis apparatus described herein to reduce resistivity of the diluate and concentrate chambers.

Terms used herein will be recognizable to those of ordinary skill in the art. Accordingly, it should be understood that when not explicitly defined, terms should be interpreted as having the meaning presently accepted by those having ordinary skill in the art.

In this application, the use of the singular includes the plural, such that the articles "a" and "an" mean "at least one", and the use of the conjunction "or" has the inclusive meaning "and/or" unless specifically stated otherwise. Unless otherwise specified, the term "including" (as well as its other forms, such as "includes" and "included") is open-ended and not intended to be limited to any specifically identified items. Unless otherwise stated, terms such as "element" or "component" encompass not just unitary modules, but also multi-module assemblies or submodules providing the same characteristics. As used herein, the terms "comprising," "having," and "including" are synonymous, unless the context dictates otherwise.

DETAILED DESCRIPTION

Advantages of the present invention will become readily apparent to those skilled in the art from the following detailed description, wherein there are described certain preferred embodiments of the invention and examples for illustrative purposes. Although the following detailed description contains many specific details for the purposes of illustration, one of ordinary skill in the art will appreciate that many variations and alterations to the following details are within the scope of the invention. Accordingly, the following embodiments of the invention are set forth without any loss of generality to, and without imposing limitations upon, the claimed invention. While embodiments are described in connection with the description herein, there is no intent to limit the scope to the embodiments disclosed herein. On the contrary, the intent is to cover all alternatives, modifications, and equivalents.

The present invention provides a device capable of reducing the resistance in an electrodialysis, electro-deionization, or capacitive deionization apparatus and a method for producing said device. More specifically, the device is an electrodialysis spacer to be used to greatly enhance ion-exchange rates which is designed to have an ionically conductive surface, of either cationic nature, anionic nature or a combination of both, which acts as conductive pathways for ions as they move towards their respective electrode—negatively charged ions (e.g. chloride) toward the positively charged anode and positively charged species (e.g., sodium) toward the negatively charged cathode. Furthermore, the invention pertains to an electrodialysis, electro-deionization or capacitive deionization apparatus that utilizes a spacer material having an ionically conductive surface.

The invention also pertains to the process and method of producing the ionically charged, ionically conductive spacer wherein the charge-neutral spacer displays an ion-conducting woven mesh or net material. The process involves coating a substrate, such as a woven mesh, expanded netting, extruded netting or non-woven material, with perm-selective ionomer solutions (ionomer solutions being the solubilized form of an ion exchange resin or membrane). The ionomer solution is applied to the non-conducting spacer via a coating process, such as, but not limited to, spray-coating, inkjet printing, curtain coating or dip-coating. The coated spacer is then cured to adhere the ion-conducting material to the non-conducting substrate and to remove supporting surfactants from the spacer surface. Prior to coating the substrate surface an additional step may be taken to increase the surface area of the substrate through chemical or mechanical processes including but not limited to acid etching, sandblasting, laser etching for enhanced turbulent effect.

In a preferred embodiment, the conductive spacer is a coated mesh or extruded netting 110 and 111 used to separate membranes 105, 106, and 107 in an electrodialysis device as shown in FIG. 1. An electrodialysis apparatus comprises an anode 103 and a cathode 104 encompassing a series of fluid channels 101, 112, 113 and 102. The fluid channels are separated by ion exchange membranes 105, 106 and 107. The ion exchange membranes alternate between anionic exchange membranes 105 and 107 and cationic exchange membrane 106. Anionic exchange membranes preferentially allow the passage of negatively charged ions 108 and substantially block the passage of positively charged ions 109. Cationic exchange membranes preferentially allow the passage of positively charged ions 109 and substantially block the passage of negatively charged ions 108. The fluid channels 101 and 102 contain the electrolyte that is in direct contact with the anode 103 and cathode 104, which may be the same or different fluid as the fluid entering the electrodialysis apparatus 100.

In an electrodialysis cell, when an electric charge is applied to the anode 103 and cathode 104, the ions in the fluid stream 100 flow through channels 110 and 111 migrate towards the electrode of opposite charge. The alternating arrangement of the ion exchange membranes thus produces alternating channels of decreasing ionic concentration 112 and increasing ionic concentration 113. The number of channels 112 and 113 may be increased through the addition of more alternating pairs of membranes to increase the capacity of the electrodialysis apparatus. Further, the functioning ability of an individual electrodialysis cell may be greatly augmented by configuring electrodialysis cells into electrodialysis stacks (i.e. a series of multiple electrodialysis cells).

Figure 2:
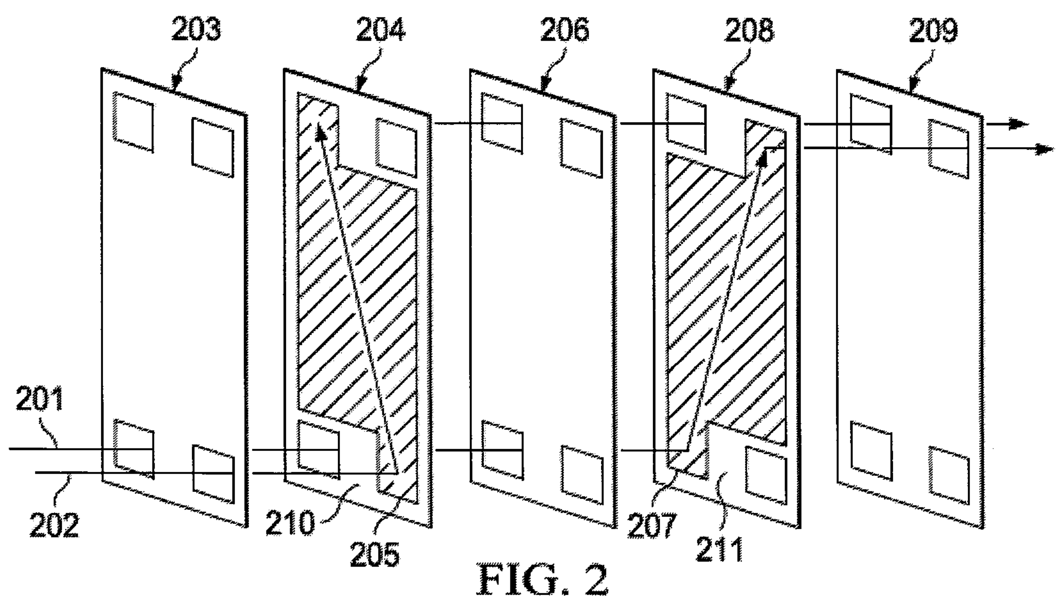
FIG. 2 is a general arrangement of an exploded view of the spacers between alternating membrane types within an electrodialysis apparatus.

To create the fluid channels 112 and 113, spacers are inserted between the membranes. This spacer may be comprised of two parts as shown in FIG. 2. The first part is a spacer frame 210 and 211 which can be made of a plastic or elastomeric material and act as a seal between fluid chambers as well as providing a seal between the internal fluids and the outside. The second part is a spacer mesh 205 and 207, which can be either woven or extruded netting 205 and 207 that spans the internal opening in the sealing frame 210 and 211 and provide fluid channels between membranes 203 and 206, and 206 and 209. The spacer mesh 205 and 207 and spacer frame 210 and 211 can optionally be connected to form spacer 204 and 208, through methods including but not limited to sonic welding, lamination or adhesives. By alternating the orientation of the spacer 204 and 208 two distinct channels 201 and 202 are formed internally between anionic exchange membrane 203 and 209 and cationic exchange membrane 206.

Figure 3:
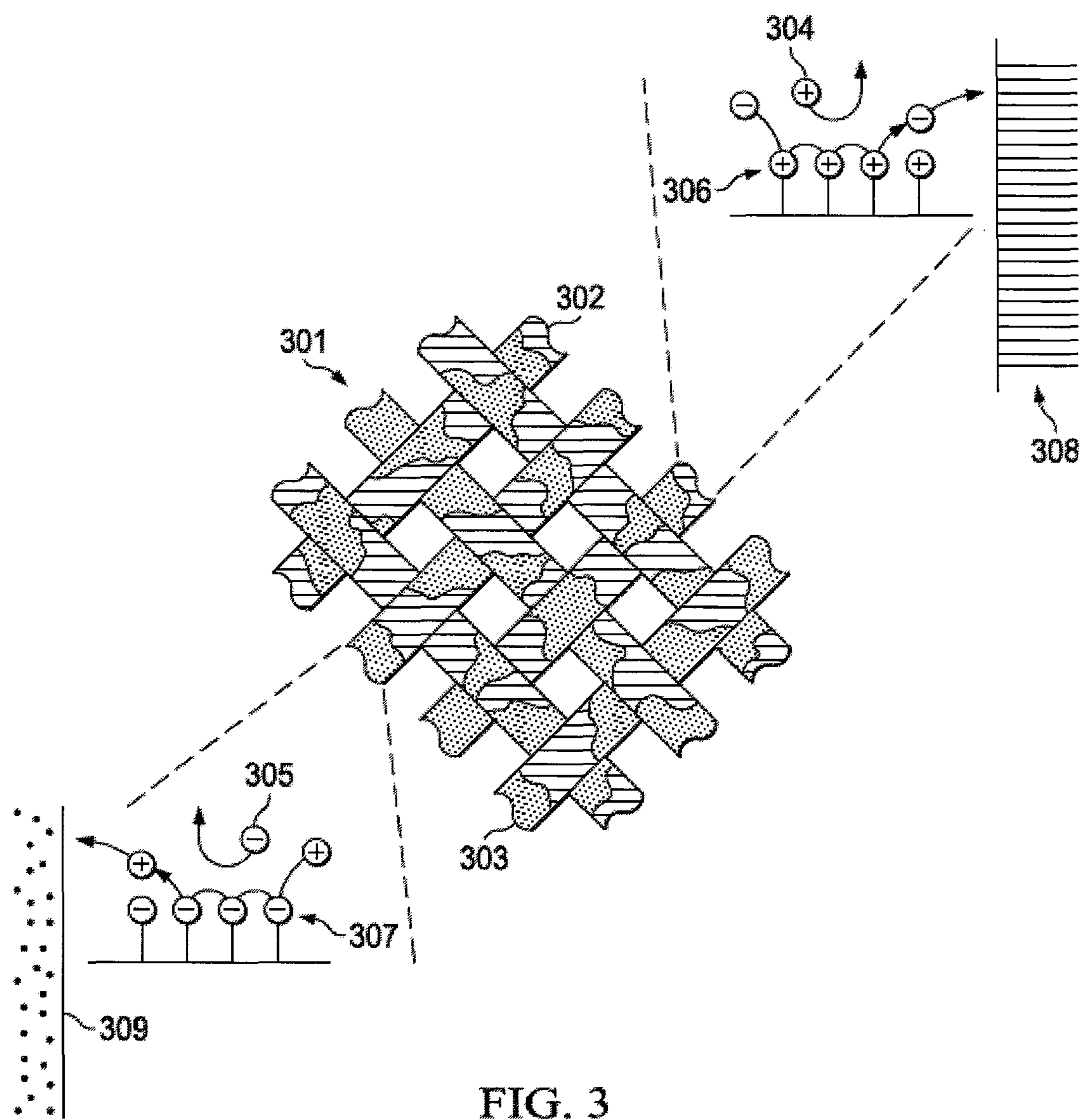
FIG. 3 is a detailed schematic of a bipolar conductive spacer surface prepared using a process with anionomer and cationomer solutions applied simultaneously to an ion exchanging unit spacer's exterior surface. together with the movement of anions and cations along the surface of the spacer in route to the surface of the ion exchange membranes.

A primary source of electrical resistance in the electrodialysis apparatus is due to fluid in channel 112 (see FIG. 1) as it reduces in ionic concentration. The present invention addresses this issue through the application of ionomers to the surface of the mesh spacer that separates the membranes. In an exemplary embodiment, the ionomers are applied concurrently resulting in a surface with bipolar ionic conductivity, exhibiting both cationic and anionic qualities, as shown in FIG. 3. The concurrent coating of the mesh substrate 301 produces a surface partially coated in anionic exchange ionomer 302 and partially coated in cationic exchange ionomer 303 (see FIG. 3). The result is a network of oppositely charged ionic pathways, which may be less resistive to ionic flux than the surrounding fluid. Functionally, as depicted in FIG. 3, as the ionic solution passes through the electric field in the electrodialysis apparatus, transport is facilitated by ionic pathways to the surface of the adjacent ion exchange membranes 308 and 309. The anionic coated surfaces 302 have positively charged functional groups 306 which transport negative anions 305 to the anionic membrane 308. Positive cations 304 are repelled by the positively charged functional groups 306 on the anionic coated surface 302. Conversely, the cationic coated surface 303 contains negatively charged functional groups 307 that attract and transport positive cations 304 to the cation exchange membrane 309 and negative anions 305 are repelled by negative functional groups 307.

Figure 4:
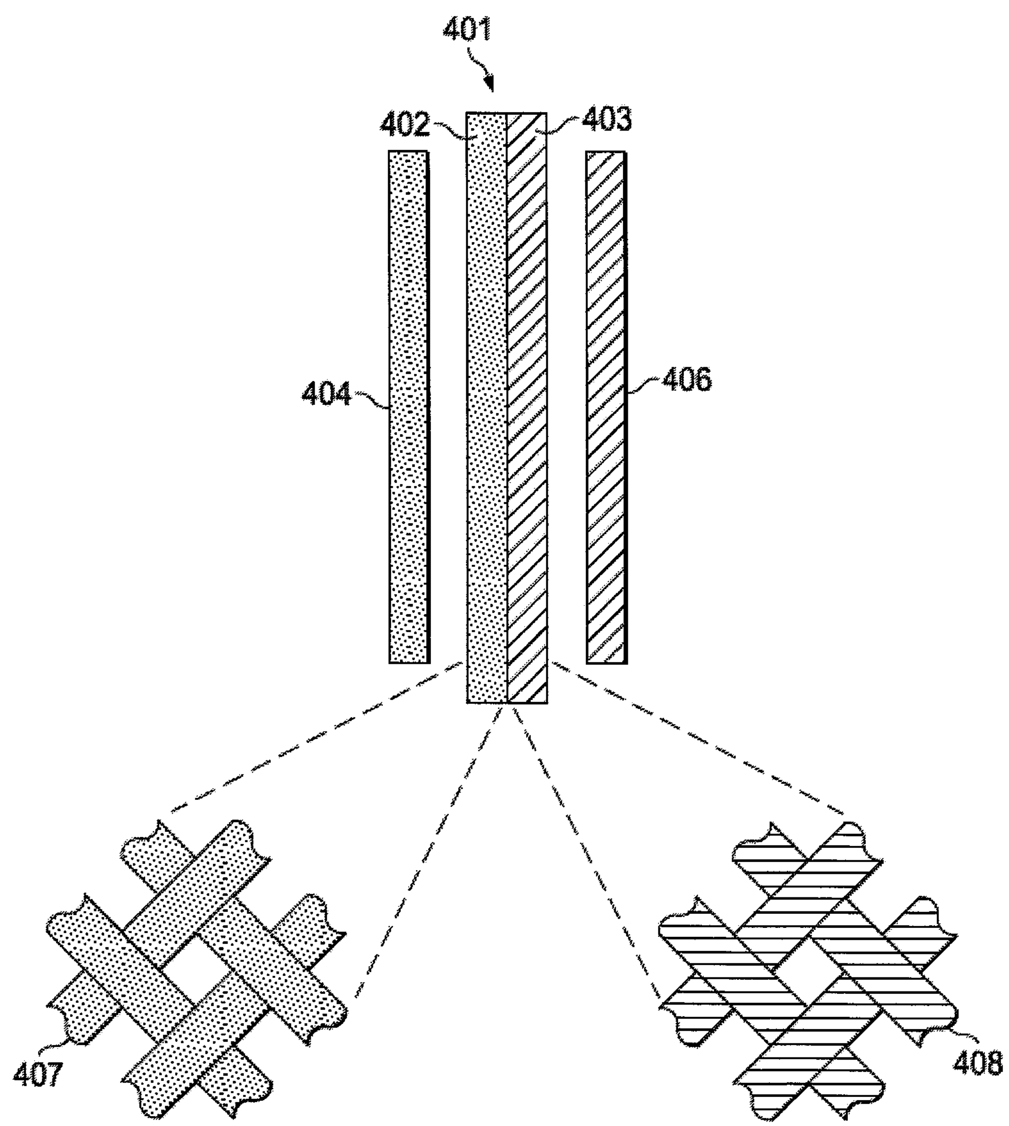
FIG. 4 is a representation of the present invention that has an ionic surface that is the same as the adjacent membrane surface.
Figure 8:
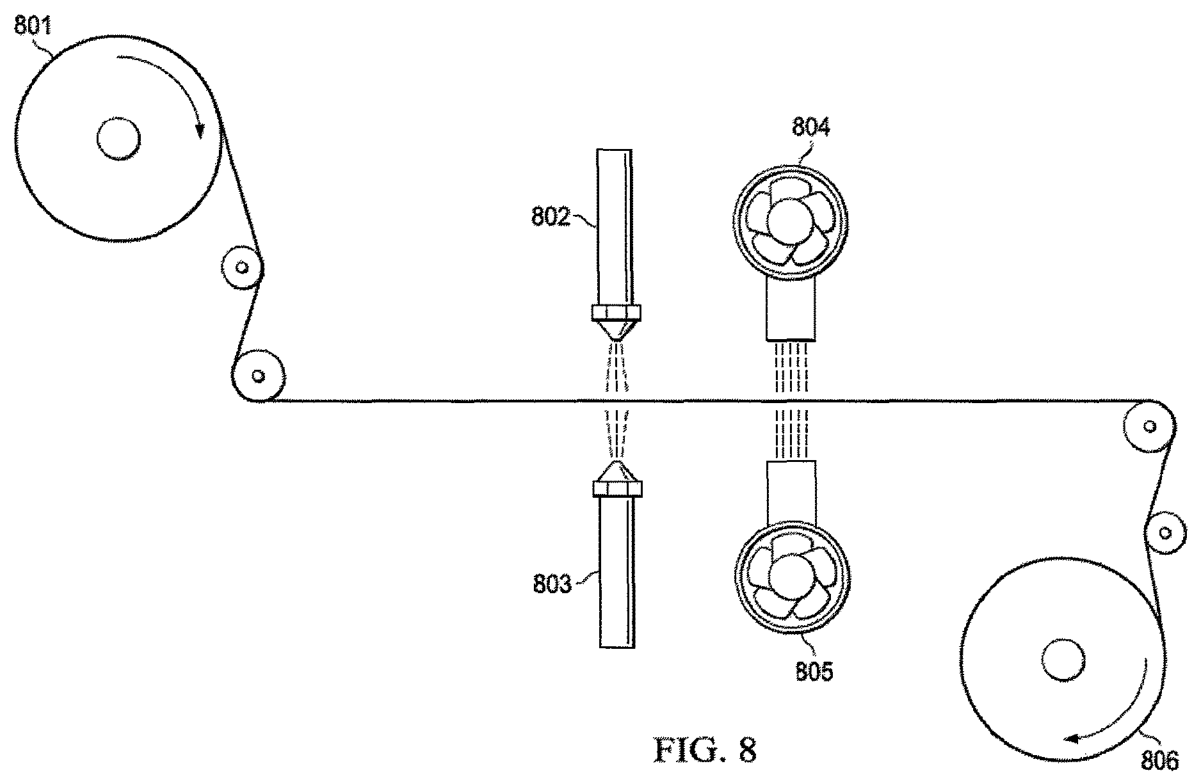
FIG. 8 is a simplified schematic of a continuous roll-to-roll process for producing bipolar conductive spacer material.

In another exemplary embodiment, a mesh spacer 401 is coated with cationic exchange ionomer 407 on one side and with anionic exchange ionomer 408 on the other side as shown in FIG. 4. This coating method extends the ion exchange material into the flow paths away from the surface of the ion exchange membranes, which lowers the resistance of the flow channels. Here, the cationic exchange membrane 404 is extended by the cationic coated surface 402 and the anionic exchange membrane 406 is extended by the anionic exchange surface 403.

Representationally, FIG. 5 provides a flow diagram illustrating the process of producing the ion-conductive spacer that is the present invention. The first step is the surface preparation. Here a chosen material, such as Nylon, PET, PTFE, or any other plastic, is appropriately shaped to allow fluid (e.g. water) to flow both around and through it. This process could also include cutting the spacer to the desired size for incorporation into an electrochemical apparatus (e.g. an electrodialysis apparatus). This sizing step could also be done at a different point in the process, such as just prior to incorporation into a device.

The second step in the process is surface modification. In this step, the spacer material is modified to enable greater adhesion between the inert plastic substrate and the ionic coating. The general idea is to increase the surface energy of the substrate, which can be accomplished via both physical and chemical methods. Physical methods include, but are not limited to, flame oxidation, corona discharge plasma, laser etching, hollow cathode glow discharge, and sandblasting. Chemical processes to increase the surface energy include, but are not limited to, treatment with strong acids (chromic, nitric, etc.), peroxide attack, and etching with strong bases (e.g. sodium hydroxide, potassium hydroxide, etc.).

Following surface modification, the surface is cleaned. The cleaning process includes rinsing the surface alternatingly with light alcohols (ethanol, 2-propanol, etc.) and deionized water. The cleaned surface is then dried and is ready for the application of the ionic material.

The application process is a coating process, and therefore can be done via such methods as dip-coating, spray-coating, roll-coating, etc. In a preferred embodiment, spray-coating is used. Here, a dilute solution containing solubilized ionomer is entrained in an airstream. The combined stream passes through an atomizing nozzle and is applied to the spacer surface. Either the nozzle, the spacer, or both are moved such that the entire exposed surface of the spacer is coated with the solution. The process variables (i.e. solution concentration, number of passes, flow rate, droplet size, etc.) will all have an impact on the loading of the produced spacer material.

The drying process serves to remove excess solvent and to cure (set) the ionomer into a resin. The drying process can be done concurrent with, and/or subsequent to, the coating process. The drying process can be done with, or without, the addition of heat source. Heat can be transferred to the spacer via convection, radiation, or conduction, with the preferred method being convection.

The next step in the process is to immerse the coated spacer into salt-containing water (e.g. a mixture containing a combination of sodium chloride and water. This immersion step allows for the ionomer to exchange its pendant charge group (such as hydroxide) for a salt ion, such as chloride.

The final step in the process is to incorporate the ion conductive spacer into the electrochemical device (e.g. an electrochemical ion separation device). The spacer must be sized to fit within the active area of the device, and preferably out of the sealing area. The spacer can be sized prior to coating, after coating, or at another step within the process. Depending on the orientation of the ionic coating, it may be important which side needs to face which membrane. In one preferred embodiment, a spacer with different ionic coatings on each side of the spacer is placed such that the anionomer-coated surface faces the anion exchange membrane, and the cationomer-coated surface faces the cation exchange membrane within the stack as in FIG. 4.

A conductive spacer may also be produced via a process with no surface preparation or surface modification. The description of the final four steps of FIG. 5 detail how such a process would work.

Another preferred embodiment incorporates a spray-coating process for applying ionic material. Atomizing spray nozzles 701 and 702 distribute ionomeric solution where pressurized air entrains the solubilized ionic material onto a receiving surface. The tip of the nozzle atomizes fluid into microdroplets, 703 and 704, which are deposited onto the spacer surface 705. In some embodiments, microdroplets 703 and 704 contain the same ionomer solution, either cationic or anionic, and in other embodiments microdroplets 703 contain an anionic ionomer solution, while microdroplets 704 contain a cationic ionomer solution. Items air 706 and fan 707 illustrate the convective drying process wherein air 706 is moved by a fan 707 onto the spacer surface. The fan 707 can also contain a heating element such that the air 706 transfers heat to aid in the drying process.

In a yet another embodiment, bulk spacer material is wound onto a dispensing roll 801, fed through rollers to an area where it is exposed on either side to spray ionomeric solution distributing nozzles 802 and 803. Ionomeric solution distributing nozzles 802 and 803 may contain the same ionomer solution (either anionic or cationic), or ionomeric solution, distributing nozzle 802 may eject either cationic or anionic ionomeric solution, and ionomeric solution distributing nozzle 803 may eject either cationic or anionic ionomeric solution. Alternatively, the process herewith defined may consist of any combination, in parallel, series or alternating combination that results in the uniform, patterned, regular or irregular application of the ionomeric solution. Fans 804 and 805 may or may not contain heating elements to provide convective heat transfer to dry the spacer material. Convection both speeds up the drying process and helps to reduce the amount of material blocking the open areas of the spacer. Receiving roll 806 shows the finished material that may undergo further processing.

EXAMPLES

Example 1

Nylon mesh spacer was cut to the desired dimension for use in a flowing electrodialysis apparatus. Solutions of solubilized Nafion and an anionic ionomer (FUMION FLA from Fumatech Gmbh) were diluted to 1 wt % using reagent alcohol (blend of ethanol, methanol and 2-propanol). The separate solutions were loaded into separate air-driven spray guns. The spacer was held such that one side was exposed to the spray gun. First, the exposed side was sprayed with the Nafion solution, covering all available surfaces. The wet spacer is subsequently dried using a heat gun (a heating coil with fan and a nozzle for directing the heat). This process was repeated until the desired loading of 1.25 mg/in$^2$ was applied to the first side. The coated spacer is then reversed, exposing the uncoated side to the spray gun. Then, the entire process was repeated with the anionic solution.

Figure 9:
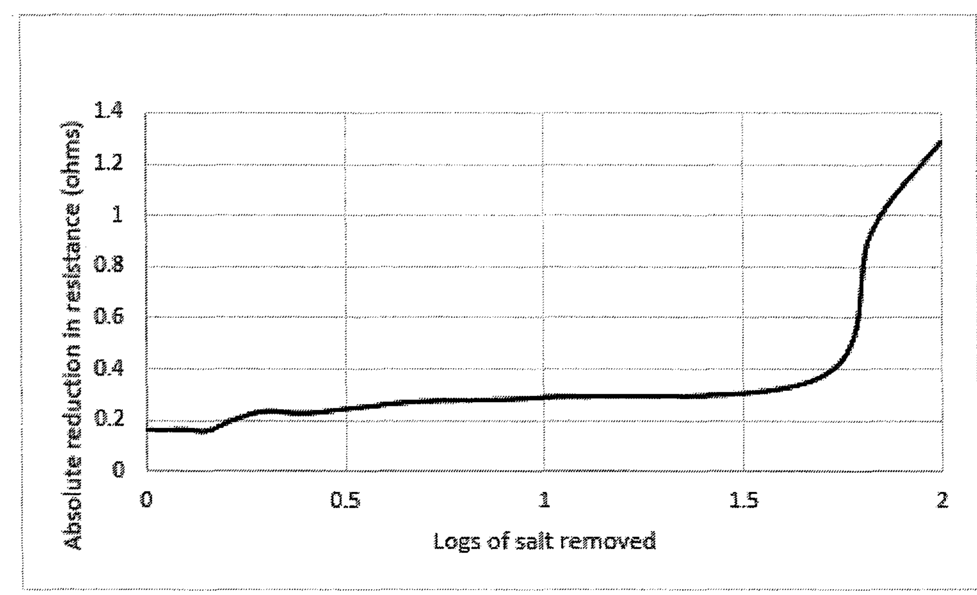
FIG. 9 is a graph that compares the resistance of an electrodialysis spacer with and without conductive spacers FIG. 10 a graph that compares the resistance of an electrodialysis spacer with and without conductive spacers It should be understood, however, that the specific embodiments given in the drawings and detailed description do not limit the disclosure. On the contrary, they provide the foundation for one of ordinary skill to discern the alternative forms, equivalents, and modifications that are encompassed by the scope of the appended claims.

Six of these spacers were incorporated into a flowing electrodialysis apparatus. The coated spacers were placed in between the alternating anion and cation exchange membranes. Care was taken to place the anionic-coated side of the spacer facing the anion exchange membrane and the cationic-coated side facing the cation exchange membrane. Brackish water was desalinated using this device and the performance was compared to a standard design where the only difference is that the spacers were not coated with the ionomer solutions. As seen in FIG. 9, the resistance of the system with the conductive spacers is lower than the baseline cell device with non-conducting spacers at all salinities, and this difference becomes greater as the total resistivity of the system increases (i.e. at low salinity values). In the experiment the salinity was reduced two orders of magnitude from the initial concentration.

Example 2

Solutions of anionic and cationic ionomer at 1 wt % were made in the way described in Example 1. Instead of spraying each solution on one side of the spacer, here the two solutions are sprayed simultaneously onto the Nylon spacer. The two solutions are sprayed, and the wet spacers dried, as described above, until the desired loading of 1.25 mg/in2 is achieved. Afterward the spacer is reversed, and the process repeated until the reverse side also reaches the desired loading. Spacers made in this manner can be placed between the alternating ion exchange membranes of the electrodialysis apparatus in either orientation without affecting the performance.

Figure 10:
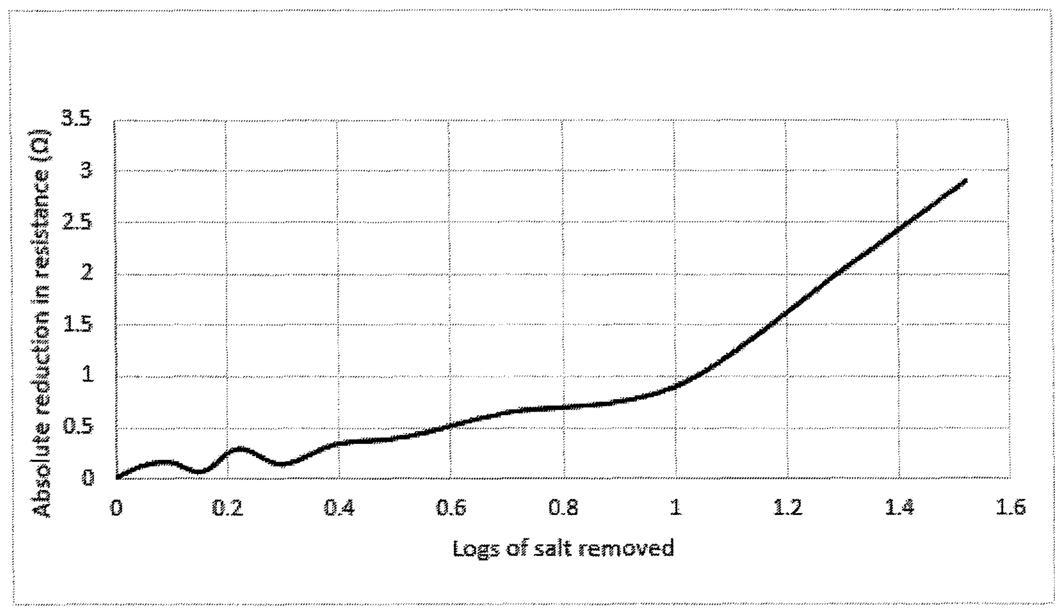

Six of these spacers were incorporated into an electrodialysis apparatus, placed in between alternating ion exchange membranes. Brackish water was desalinated using this device and the performance was compared to a standard design where the only difference is that the spacers were not coated with the ionomer solutions. As seen in FIG. 10, the resistance of the experimental design is similar to the control design (identical electrodialysis apparatus with non-conducting spacers) at the initial concentration. As salt is removed from the product water in the electrodialysis process, the experimental design becomes less resistive relative to the control, and this difference increases as more salt is removed from the system. In this experiment, the salinity was reduced 1.5 orders of magnitude from the initial concentration.

What is claimed is:

1. An electro-chemical apparatus for reducing the resistance in an electrodialysis, electro deionization, or capacitive device, comprising:

a. a pair of electrodes;

b. an applied voltage;

c. alternating anionic and cationic exchange membranes placed between the pair of electrodes for separation of ions from a depleted stream to a concentrate stream;

d. an ionically neutral, non-conducting spacer which may be woven, porous or non-woven;

e. said spacer with an exterior surface having a first side and a second side opposite the first side, the first side comprises a first coating comprising a cationic exchange ionomer and the second side comprises a second coating comprising an anionic exchange ionomer, wherein the first coating is different from the second coating.

2. The electrochemical apparatus of claim 1, wherein the first and second coatings are a topical application onto the exterior surface of said ionically neutral, non-conductive spacer that is a woven mesh, expanded netting, extruded netting or a non-woven material.

3. The electrochemical apparatus of claim 1, wherein the first and second coatings are applied to said spacer via a coating process comprising spray-coating, inkjet printing, curtain coating or dip-coating.

4. The electrochemical apparatus of claim 3, wherein the coated spacer is cured to assure adherence of ion-conducting, ionically charged material to said spacer.

5. The electrochemical apparatus of claim 1, wherein the first and second coatings form a network of anionic or cationic exchange channels, which act as an array of conductive pathways for ions and ion exchange.

6. The electrochemical apparatus of claim 1, wherein said spacer's surface is chemically altered via acid etching treatment with strong, peroxide attack, and etching with strong bases to create deformities in said spacer's surface for the creation of turbulent rheologic disturbances for an enhanced ion-exchange rate.

7. The electrochemical apparatus of claim 1, wherein said spacer's surface is mechanically altered via flame oxidation, corona discharge plasma, laser etching, hollow cathode glow discharge, or sand-blasting for the creation of turbulent rheologic disturbances for an enhanced ion exchange rate.

8. The electrochemical apparatus comprising:

a. a spacer for reducing the resistance in an electrodialysis, electro-deionization, or capacitive device where the spacer has a first side and a second side opposite the first side, the first side comprises a first coating comprising a cationic exchange ionomer and the second side comprises a second coating comprising an anionic exchange ionomer, wherein the first coating is different from the second coating, residing between anionic and cationic ion exchange membranes, which facilitates transport of n ionic solution through oppositely charged ionic pathways to surfaces of the ion exchange membranes;

b. at least one anode or a plurality of anodes;

c. at least one cathode or a plurality of cathodes;

d. one or a plurality of fluid channels separated by anionic and cationic ion exchange membranes, where the anionic exchange membranes preferentially allow the passage of negatively charged ions and substantially block the passage of positively charged ions and cationic exchange membranes preferentially allow the passage of positively charged ions and substantially block the passage of negatively charged ions and exhibit alternating pathways of ever decreasing ionic concentration streams and increasing ionic concentration streams;

e. electrolyte containing fluid channels in direct contact with the anode and cathode which may be the same or different fluid as the fluid entering the electrodialysis device; and f. an electric charge applied to the anode and cathode thereby causing the ions in the fluid stream to flow through the fluid channels and migrate toward the electrodes displaying the opposite electric charge.

9. The electrochemical apparatus of claim 8, wherein the first and second coatings extend the ion exchange material into the flow paths away from the surface of the ion exchange membranes thereby lowering the resistance within the flow channels.

10. The electrochemical apparatus of claim 8, wherein the spacer residing between ionically charged membranes comprises: (1) a spacer frame that acts as a seal between fluid chambers and as a seal between internal fluids and the exterior; and (2) a spacer mesh, which is either woven or extruded netting, that spans the internal opening in the sealing frame and provides fluid channels between ionically charge membranes through alternating fluid pathways through said spacer and into contact with said ionically charged membranes.

11. The electrochemical apparatus of claim 9, wherein the spacer is made of a non-reactive, non-ionic plastic or elastomeric material that is made to display ionomers resulting in a spacer that is bipolar in nature.

* * * * *